United States Patent
Lee

(10) Patent No.: US 7,489,778 B2
(45) Date of Patent: Feb. 10, 2009

(54) MOBILE COMMUNICATION TERMINAL WITH ROTARY CAMERA

(75) Inventor: Kyu Hun Lee, Seoul (KR)

(73) Assignee: LG Electronics Inc, Seoul (KR)

( * ) Notice: Subject to any disclaimer, the term of this patent is extended or adjusted under 35 U.S.C. 154(b) by 919 days.

(21) Appl. No.: 10/846,173

(22) Filed: May 13, 2004

(65) Prior Publication Data

US 2004/0228477 A1   Nov. 18, 2004

(30) Foreign Application Priority Data

May 13, 2003   (KR) .................... 10-2003-0030303

(51) Int. Cl.
*H04M 1/00* (2006.01)
*H04M 9/00* (2006.01)

(52) U.S. Cl. .................... 379/433.13; 379/433.11; 455/575.3

(58) Field of Classification Search ............ 379/433.01, 379/433.11, 433.13; 348/14.02; 455/575.1, 455/575.3, 556.1, 556.2

See application file for complete search history.

(56) References Cited

U.S. PATENT DOCUMENTS

2001/0036845 A1 * 11/2001 Park ........................ 455/566
2004/0012701 A1 * 1/2004 Nagai et al. ............ 348/333.12

FOREIGN PATENT DOCUMENTS

KR   1020000047093 A   7/2000

\* cited by examiner

*Primary Examiner*—Curtis Kuntz
*Assistant Examiner*—Tuan D Nguyen

(57) ABSTRACT

There is provided a mobile communication terminal having a connecting apparatus for allowing unrestricted rotation of a rotary camera disposed on the terminal while maintaining an electrical circuit between the camera and a Printed Circuit Board (PCB) installed in the terminal. The connecting apparatus uses a plurality of bearings disposed on an outer circumferential surface of a connecting member to maintain the circuit. A portion of the member adjacent to the camera rotates with the camera while the remaining portion is fixed. The bearings also provide sufficient resistance to prevent unintended rotation of the camera.

19 Claims, 6 Drawing Sheets

MOBILE COMMUNICATION TERMINAL WITH ROTARY CAMERA

CROSS REFERENCE TO RELATED APPLICATIONS

Pursuant to 35 U.S.C. § 119(a), this application claims the benefit of earlier filing date and right of priority to the Korean Patent Application No. 2003-30303, filed on May 13, 2003, the content of which is hereby incorporated by reference in its entirety.

BACKGROUND OF THE INVENTION

1. Field of the Invention

The present invention relates to a mobile communication terminal, and more particularly, to a mobile communication terminal with a rotary camera.

2. Description of the Related Art

In general, mobile communication terminals include cellular phones or Personal Communication Systems (PCS) having wireless communication capabilities. As the need for video/image communication emerges along with voice communication, several types of mobile communication terminals with an integrated photographic apparatus have been suggested to satisfy this demand.

Efforts have been made to provide mobile communications devices with cameras which are capable of rotating about an axis in order to better provide the capability of capturing a photographic image while the user is still able to view the display screen of the communications device. The ability to position a rotary camera to capture an image while still being able to view the display screen allows the user to continue communicating, via voice or data transmission, while the photographic image is captured.

As shown in FIGS. 1 to 3, a conventional mobile communication device equipped with a rotary camera 1 includes a main body 10 with a main printed circuit board 11 installed therein. A folder 20 is rotatably installed at one end of the main body 10 by a hinge 30. A camera 40 is rotatably installed at a certain angel adjacent to the hinge 30.

The camera 40 includes a collar 42 formed on the outer side of a camera housing 41 and a cap 43 inserted at the inner of the camera housing 41. A camera module 45 having a lens 44 is installed inside the camera housing 41, wherein the lens 44 is exposed at a front surface of the camera housing 41. A connecting bar 45 extends from the cap 43 to allow rotation of the camera 40. An engaging device 46, which is formed at the end of the connecting bar 45, is inserted into a coupling groove 31a of an engaging jaw 31 formed at the hinge 30. Accordingly, the camera module 45 is constructed to be rotated in the direction of the arrow in FIG. 2 (or counterclockwise around the connection bar 45).

A slot (not shown) is formed at a middle portion of the cap 43, through which a flexible printed circuit board (FPCB) 12 is inserted into the housing 41. One end of the FPCB 12 is connected to the camera module 45, and the other end thereof is fixed at the main PCB 11 installed at the main body 10. The FPCB 12 has a structure that may not be expanded and contracted in terms of its characteristics, so if a user rotates the camera 40 excessively or forcibly in controlling a photographing angle of the camera 40, the FPCB may be pulled, stretched or torn, thereby breaking the FPCB 12.

To remedy this, the FPCB 12 is wound on the connecting bar 45 several times. Accordingly, when the camera 40 is rotated clockwise or counterclockwise to control the photographing angle of the camera 40, the FPCB 12 wound on the connecting bar 45 of the cap 43 can be wound or unwound, so that the FPCB 12 would not be broken. However, in the conventional mobile communication device 1, an interior of the hinge 30 is so narrow that the FPCB 12 is wound on the connecting bar 45 only a finite number of times. Therefore, rotation of the camera is limited to the number of times the FPCB is wound around the connecting bar 45.

Since the rotational angle and rotational direction of the camera 40 are limited as the FPCB 12 wound on the connecting bar 45 of the cap 43 is unwound or wound, the user cannot rotate the camera 40 in one direction, for example, clockwise, continuously, causing inconvenience in using the camera 40.

SUMMARY OF THE INVENTION

Accordingly, the present invention is directed to a mobile communication terminal with a rotary camera that substantially obviates one or more problems due to limitations and disadvantages of the related art above.

An object of the present invention is to provide a mobile communication terminal with rotary camera having unrestricted rotation.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a mobile communication terminal comprising a hinge disposed on one end of a main body; a camera rotatable along an axis; and a connecting apparatus disposed between the camera and the hinge to maintain an electrical circuit between the camera and a main Printed Circuit Board (PCB) installed in the first folding body during rotation of the camera.

According to one aspect of the present invention, the connection apparatus may comprise a support member fixed to the hinge; a connecting member for connecting the support member to the camera, wherein the connecting member comprises first and second sides; a first Flexible Printed Circuit Board (FPCB) connected at a first end to the main PCB and connected at second end to the first side of the connecting member; and a second FPCB connected at a first end to the camera and connected at second end to the second side of the connecting member.

According to another aspect of the present invention, the connecting member may comprise a fixed plate disposed at the first side of the connecting member, wherein the fixed plate is fixedly attached to the support member; and a rotating plate disposed at the second side of the connecting member, wherein the rotating member correspondingly rotates with the camera.

According to another aspect of the present invention, the connecting member may also comprise a plurality of recesses are formed on a outer circumferential surface of the fixed plate; a plurality of recesses formed on a outer circumferential surface of the rotating plate, wherein the plurality of recess formed on the rotating plate correspond to the plurality of recesses are formed on the fixed plate; and a plurality of bearings that maintain an electrical circuit between the camera and the main PCB, wherein each bearing is disposed within a pair of corresponding recesses formed on the rotating plate and the fixed plate.

Other features and advantages of the present invention will become apparent from the following detailed description when taken in conjunction with the accompanying drawings, which illustrate, by way of example, the principles of the invention.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention. In the drawings.

Features, elements, and aspects of the invention that are referenced by the same numerals in different figures represent the same, equivalent, or similar features, elements, or aspects in accordance with one or more embodiments.

DETAILED DESCRIPTION OF PREFERRED EMBODIMENTS

Figure 1:
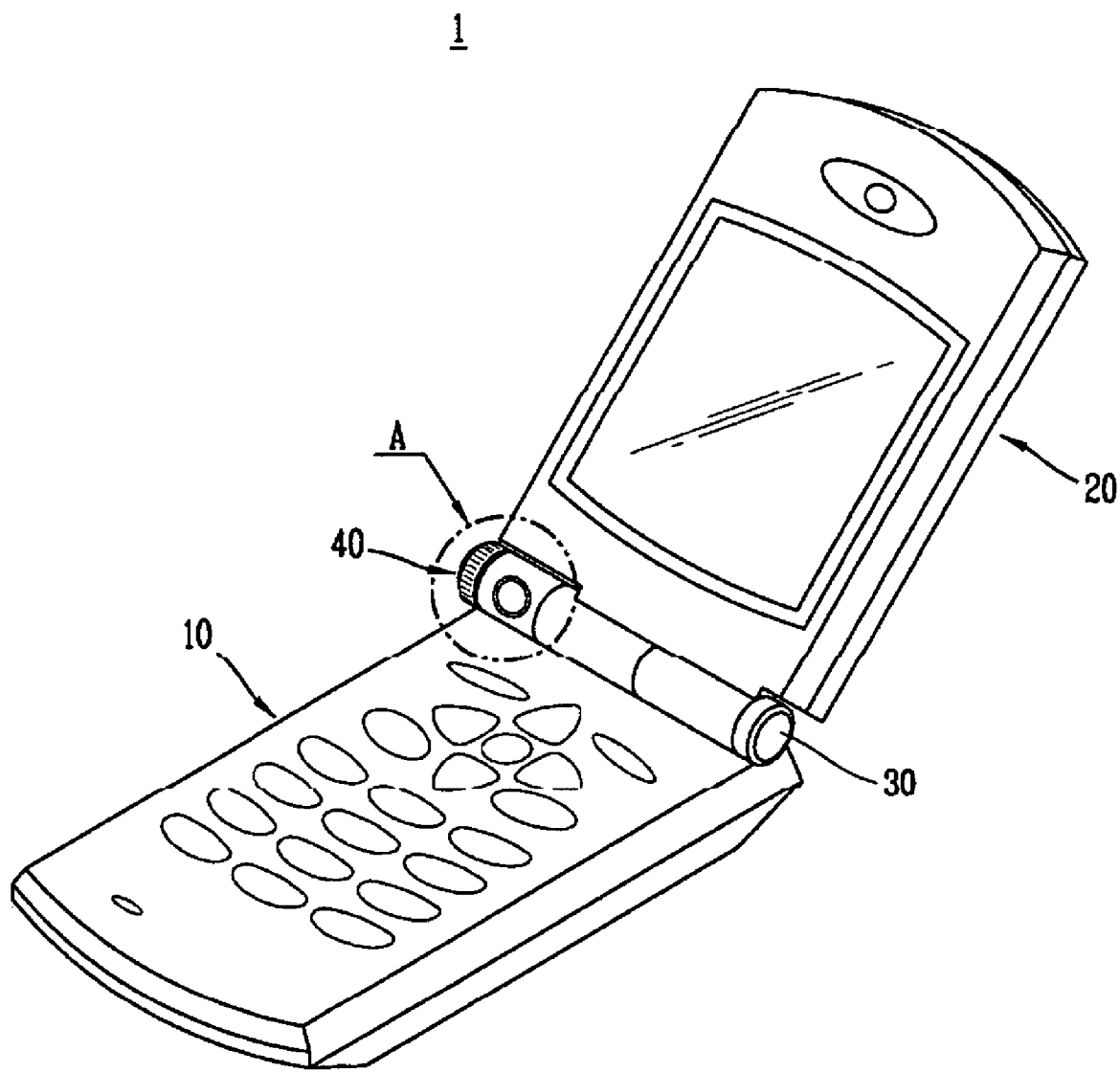
FIG. 1 illustrates a perspective view of a mobile communication terminal in accordance the related art.
Figure 2:
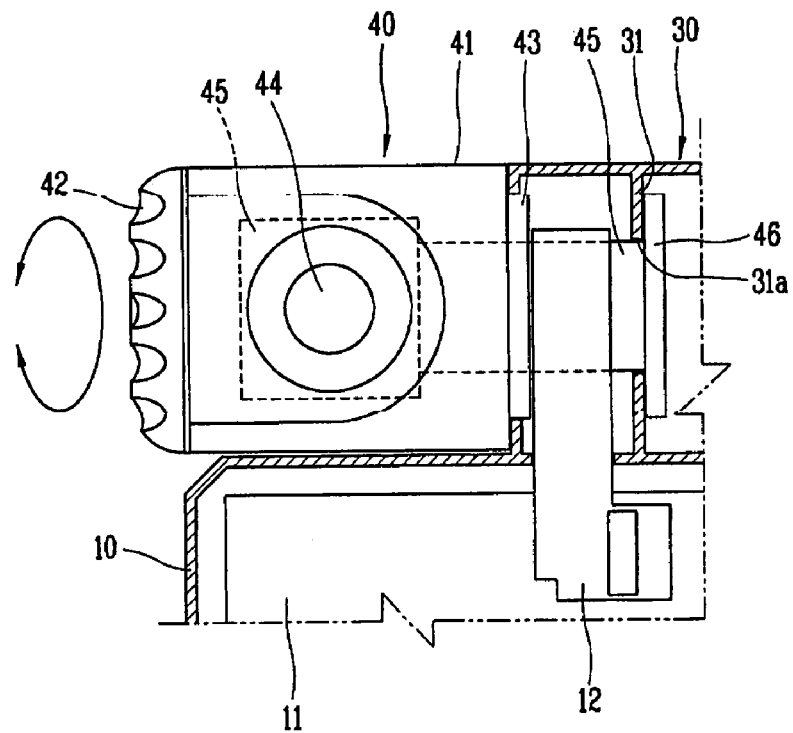
FIG. 2 illustrates a partial sectional view of portion "A" of FIG. 1.
Figure 3:
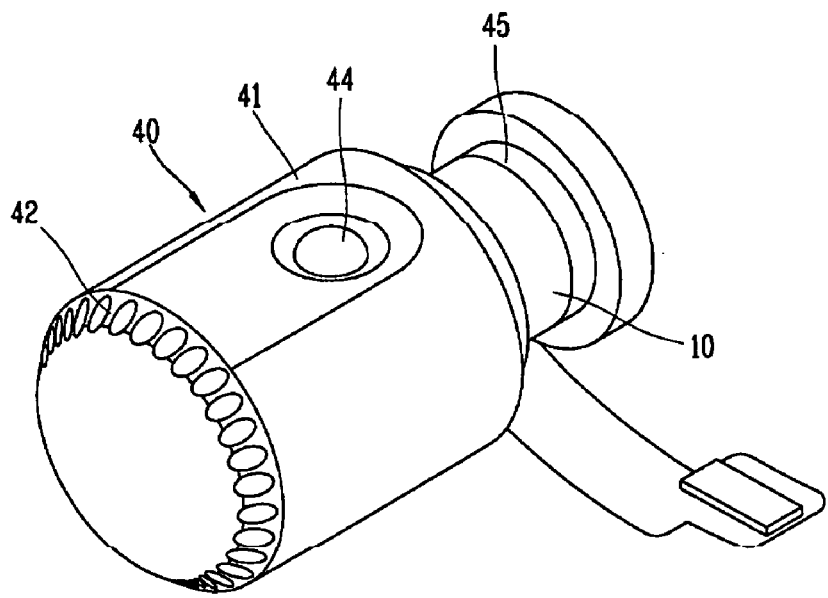
FIG. 3 illustrates a perspective view of a rotary camera in accordance with the related art.
Figure 4:
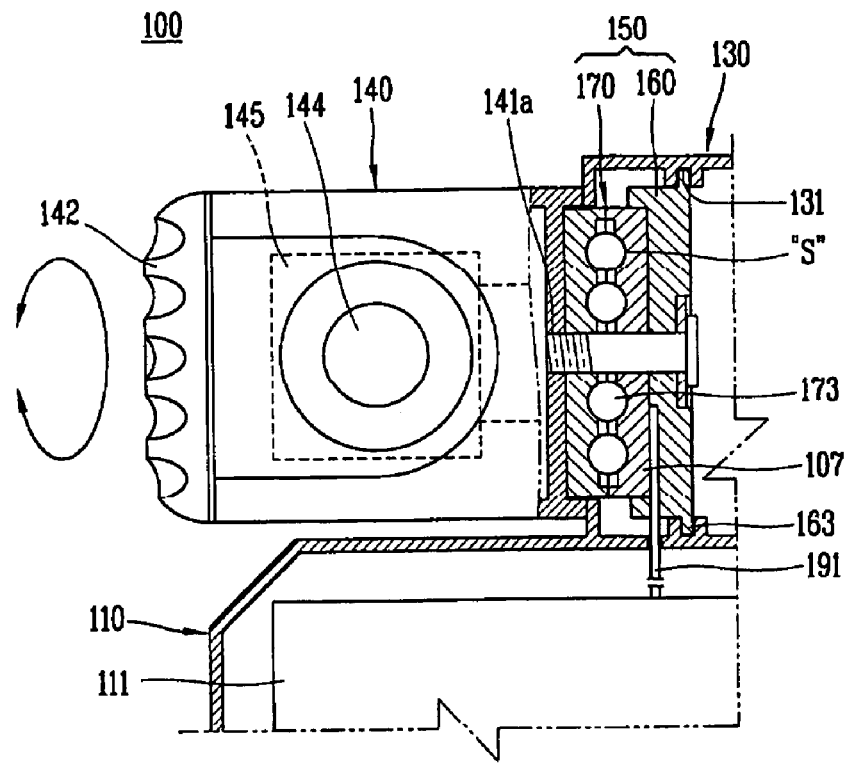
FIG. 4 illustrates a partial sectional view of a rotary camera installed on a mobile communication terminal in accordance with an embodiment of the present invention.

The present invention relates to a camera that is mountable in a mobile communications terminal and that allows the user of the terminal to precisely adjust the angle of the camera with respect to the body of the freely by freely rotating the camera. Although the present invention is illustrated with regard to a folder-type mobile terminal, it is contemplated that the present invention may be utilized with any type or configuration of mobile communication device (for example, PDA or notebook with wireless communication capabilities) or anytime it is desired to provide photographic capabilities for a communications device while allowing unlimited rotation of the camera.

As shown in FIGS. 4 to 7, a mobile communication terminal in accordance with a preferred embodiment of the present invention comprises a main body 110 in which a main printed circuit board 111 is installed, a folder (not shown) rotatively connected to one end of the main body 110 via a hinge 130, and a camera 140 rotatably installed adjacent to the hinge 130. The terminal further comprises a camera connecting device 150, which supports the electrical connection between the main printed circuit board 111 and the camera 140, is installed between the main body 110 and the camera 140 to allow the camera to rotate.

The camera 140 comprises a cylindrical camera housing 141 and a collar 142 formed at one side of the camera housing 141, wherein the collar 142 provides a gripping surface and serves to facilitate rotation of the camera 140 by the user. The camera 140 further comprises a camera module 145 having a lens 144, which is installed within the camera housing 141. The lens 144 is preferably exposed on the cylindrical surface of the camera housing 141.

The camera connecting device 150 comprises a support member 160 fixed at the hinge 130, and a connecting member 170 for supporting an electrically connection between the support member 160 and the camera 140. A connecting rod 180 is inserted into holes 160a and 170a, preferably formed at the center of the support member 160 and the connection member 170, respectively. Preferably, the connection bar 180 has a screw thread formed on its outer surface and is also inserted into a coupling recess 141a formed at the center of an inner side surface of the camera housing 141. Also, a washer insertion recess 161 is preferably formed at the center of a side of the support member 160, wherein the recess receives a washer 162.

The connecting member 170 comprises a fixed plate 171 and a rotating plate 172. The fixed plate is attached to the support member 160. A first side of the rotating plate 172 is rotatably coupled to the fixed plate 171 in an electrically connected state and fixed to the camera housing 141 on a second side. Namely, the fixed plate 171 is fixed at the support member 160 and cannot rotate. However, the rotating plate 172 is fixed at the camera housing 141 and can be freely rotated in a clockwise or counterclockwise around the connecting bar 180 together with the camera housing 141.

Figure 5:
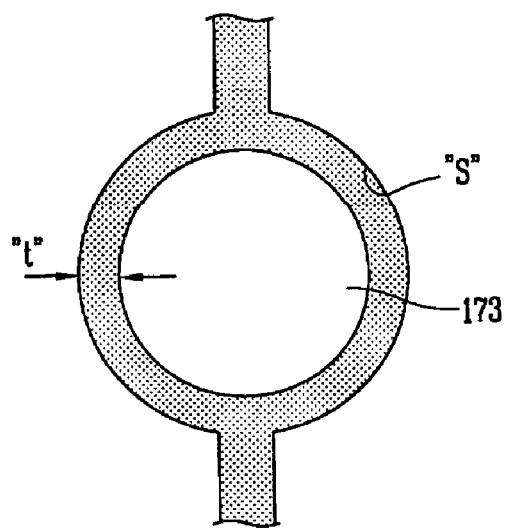
FIG. 5 illustrates an enlarged view of a bearing in accordance with an embodiment of the present invention.
Figure 6:
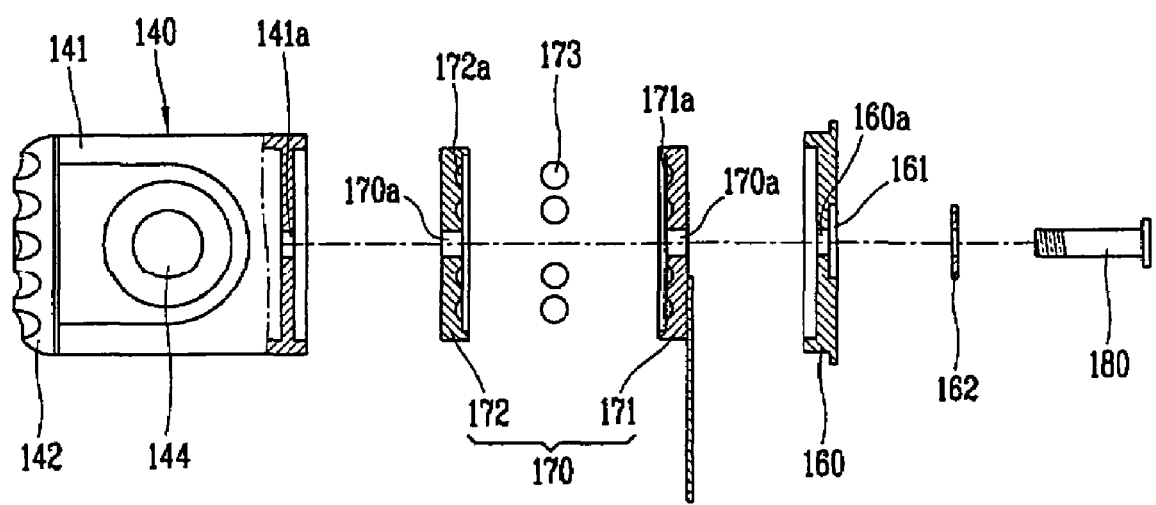
FIG. 6 illustrates an exploded sectional view of a rotary camera installed on a mobile communication terminal in accordance with an embodiment of the present invention.
Figure 7:
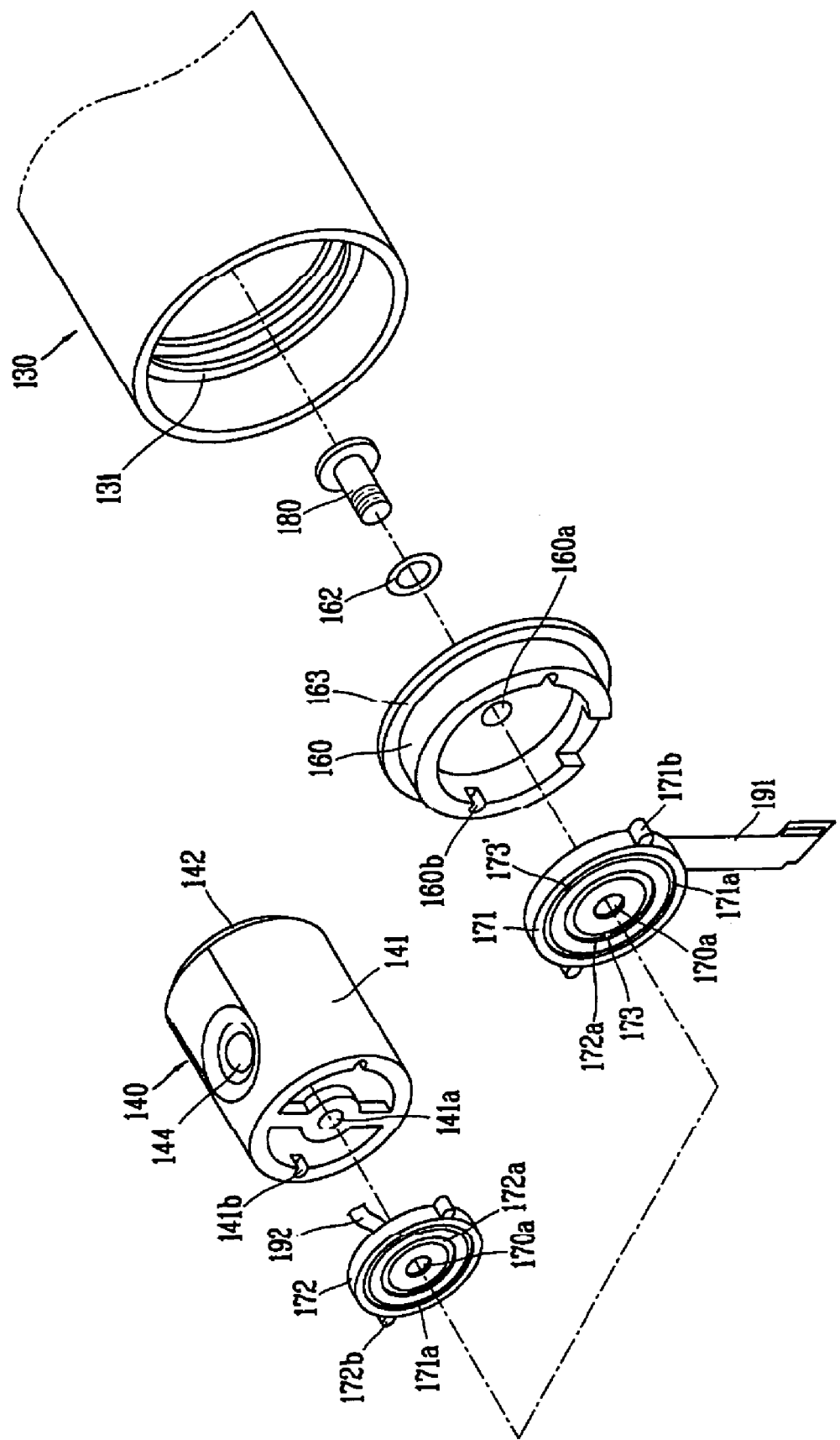
FIG. 7 illustrates an exploded perspective view of a rotary camera installed on a mobile communication terminal in accordance with an embodiment of the present invention.

A plurality of bearing insertion recesses 171a and 172a are formed at the adjacent sides of the fixed plate 171 and the rotating plate 172. Preferably, the recesses 171a and 172a form circular concavities and are disposed along the outer circumferential surfaces of the fixed plate 171 and rotating plate 172. Referring to FIG. 5 specifically, each bearing insertion recess 171a and 172a form a space (S) when the fixed plate 171 and the rotating plate 172 are coupled, and receive a plurality of bearings 173. Preferably the bearings 173 are ball bearing that comprise a spherical shape and a metal.

The use of ball bearings 173, for example, provides sufficient resistance so as to prevent the camera 140 from rotating without a manual force. A restorative force is provided when the camera is rotated a certain amount so that a bearing insertion recess 171a is not aligned with another bearing insertion recess 172a. The bearing 173 restores the position of the fixed and rotating plates 171 and 172 so that the insertion recesses 171a and 172a are aligned.

Furthermore, a lubricant, such as an oil or other petroleum based lubricants known well to one of ordinary skill in the art, is preferably filled in the interval or gap "t." This gap "t" is formed between each bearing insertion recess 171a and 172a and the bearing 173, wherein the presence of a lubricant in the gap "t" provides for smoother rotation. Also, in order to seal the lubricant, a sealing member (not shown) is preferably installed on the outer circumferential surface of the fixed plate 171 and the rotating plate 172.

A flexible printed circuit board, which connects the camera module 145, the connecting member 170 and the main printed circuit board 111, comprises a first flexible printed circuit board 191 and a second flexible printed circuit board 192. The first flexible printed circuit board 191 extends from the main printed circuit board 111 and is connected to one side of the connecting member 170, preferably to the fixed plate 171. The second flexible printed circuit board 192 connects the camera module 145 to the connecting member 170, preferably the rotating plate 172. Since plurality of bearings 173, which preferably comprise metal, are positioned between the rotating plate 172 and the fixed plate 171, an electrical connection is maintained between the camera module 145 and the main printed circuit board 111.

In order to couple the rotation plate 172 to the camera 140, at least one and alternatively a plurality of fixing grooves 141b are formed on one end of the camera housing 141. Preferably, a pair of fixing grooves 141b are formed along the inner edge of the inner circumferential surface of the camera housing 141 approximately 180° apart. A corresponding number of insertion protrusions 172b are formed at an outer circumferential surface of the rotating plate 172 and are inserted into the fixing grooves 141b.

With respect to attachment of the fixed plate 171 to the support member 160, a plurality of fixing grooves 160b are formed on one end of the support member 160. Preferably, pair of fixing recesses 160b is formed along the inner edge of the inner circumferential surface of the support member 160 approximately 180° apart. A corresponding number of insertion protrusions 171b are formed at an outer circumferential surface of the fixed plate 171 and are inserted into the fixing grooves 160b.

The support member 160 is fixed to the hinge 130, preferably via a fixing groove 131 that is formed along an inner circumferential surface of the hinge 130. A protrusion 163 is formed along an outer circumferential surface of the support member 160 so as to be inserted into the fixing groove 131.

Figure 8A:
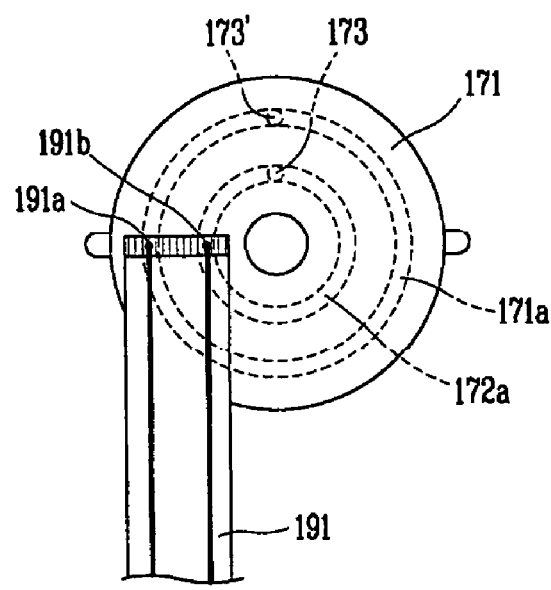
FIG. 8a illustrates a sectional view of the connection between a fixed plate and a first flexible printed circuit board in a rotary camera installed on a mobile communication terminal in accordance with an embodiment of the present invention.
Figure 8B:
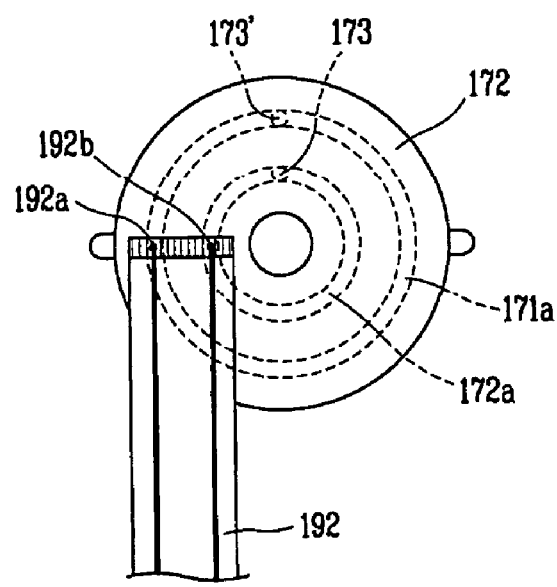
FIG. 8b illustrates a sectional view of the connection between a rotating plate and a second flexible printed circuit board in a rotary camera installed on a mobile communication terminal in accordance with an embodiment of the present invention.

Referring to FIGS. 8A and 8B, an electric connection structure between the first flexible printed circuit board 191 and the second printed circuit board 192 is shown. Power lines 191a and 192a and data lines 191b and 192b are formed at ends of the first flexible printed circuit board 191 and the second flexible printed circuit board 192. Preferably, the power line 191a and the data line 191b are electrically connected to the bottom surface of the bearing insertion recess 171a. Furthermore, the power line 192a and the data line 192b are preferably electrically connected to the bottom surface of the bearing insertion recess 172a.

A bearing 173' is inserted in the bearing insertion recess 171a, wherein the bearing 173' preferably comprises a metal and a spherical shape. The bearing 173' electrically connects the power line 191a of the first flexible printed circuit board 191 and the power line 192a of the second flexible printed circuit board 192. Furthermore, the bearing 173' electrically connects the data line 191b of the first flexible printed circuit board 191 and the data line 192b of the second flexible printed circuit board 192. Preferably, the bearing 173' remains situated within the concavity formed by the bearing insertion recesses 171a and 172a.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims. Preferred embodiments were shown in the context of folding type mobile communication terminals. In alternative embodiments, bar and PDA type terminals can be substituted for the present invention.

What is claimed is:

1. A mobile communication terminal comprising: a hinge disposed on one end of a main body; a camera rotatable along an axis; a connecting apparatus disposed between the camera and the hinge to permit unrestricted rotation of the camera while maintaining an electrical circuit between the camera and a main printed circuit board (PCB) installed in the main body during rotation of the camera; wherein the connecting apparatus comprises: a support member fixed to the hinge; a connecting member for connecting the support member to the camera, wherein the connecting member comprises first and second sides; a first flexible printed circuit board (FPCB) connected at a first end to the main PCB and connected at second end to the first side of the connecting member; and a second FPCB connected at a first end to the camera and connected at a second end to the second side of the connecting member; a center of the support member defining a hole; a center of the connecting member defining a hole; a coupling recess formed in a center of a side surface of the camera; and a connecting rod, wherein the connecting rod is inserted through the holes of the support member and connecting member and engages the coupling recess.

2. The mobile communication terminal of claim 1, further comprising a folder rotatively connected to the main body via the hinge.

3. The mobile communication terminal of claim 1, further comprising:
    a washer insertion recess formed at a center of a side surface of the support member; and
    a washer inserted into the washer insertion recess.

4. The mobile communication terminal of claim 1, wherein the connecting member comprises:
    a fixed plate disposed at the first side of the connecting member, wherein the fixed plate is fixedly attached to the support member; and
    a rotating plate disposed at the second side of the connecting member, wherein the rotating member correspondingly rotates with the camera.

5. The mobile communication terminal of claim 4, further comprising:
    a plurality of recesses formed on an outer circumferential surface of the fixed plate;
    a plurality of recesses formed on an outer circumferential surface of the rotating plate, wherein the plurality of recesses formed on the rotating plate correspond to the plurality of recesses formed on the fixed plate; and
    a plurality of bearings that maintain an electrical circuit between the camera and the main PCB, wherein each bearing is disposed within a pair of corresponding recesses formed on the rotating plate and the fixed plate.

6. The mobile communication terminal of claim 5, wherein a lubricant is disposed within a gap formed between the bearing and the pair of corresponding recesses formed on the rotating plate and the fixed plate.

7. The mobile communication terminal of claim 5, further comprising a first and second power lines and a first and second data lines,
    wherein:
    the first power and data lines electrically connect the first FPCB to a bottom surface of one of the plurality of recesses formed on the outer circumferential surface of the fixed plate;
    the second power and data lines electrically connect the second FPCB to a bottom surface of one of the plurality of recesses formed on the outer circumferential surface of the rotating plate that corresponds to the recess formed on the outer circumferential surface of the fixed plate; and the bearing disposed within the corresponding pair of recesses electrically connects the first power line to the second power line and the first data line to the second data line.

8. The mobile communication terminal of claim 5, wherein the plurality of bearings provide a sufficient resistance to prevent unintended rotation of the camera.

9. The mobile communication terminal of claim 4, wherein the camera and the rotating plate rotate along an axis formed by a connecting rod.

10. The mobile communication terminal of claim 4, wherein the rotating plate is fixedly attached to the camera.

11. The mobile communication terminal of claim 10, further comprising:
   at least one fixing groove formed on an inner circumferential surface of the camera adjacent to a side surface of the camera; and
   at least one protrusion formed on an outer circumferential surface of the rotating plate, wherein the at least one protrusion engages the at least one fixing groove to fixedly attach the rotating plate to the camera.

12. The mobile communication terminal of claim 4, further comprising:
   at least one fixing groove formed on an inner circumferential surface of the supporting member; and
   at least one protrusion formed on an outer circumferential surface of the fixed plate, wherein the at least one protrusion engages the at least one fixing groove to fixedly attach the fixed plate to the supporting member.

13. The mobile communication terminal of claim 1, further comprising:
   a fixing groove formed along an inner circumferential surface of the hinge; and
   a protrusion formed along an outer circumferential surface of the supporting member, wherein the protrusion engages the fixing groove to fixedly attach the supporting member to the hinge.

14. An apparatus for unrestricted rotation of a camera installed on a mobile communication terminal, the apparatus comprising: a support member fixed to the terminal; a connecting member for connecting the support member to the camera, wherein the connecting member comprises first and second sides; a first flexible printed circuit board (FPCB) connected at a first end to a main printed circuit board (PCB) and connected at a second end to the first side of the connecting member; a second FPCB connected at a first end to the camera and connected at second end to the second side of the connecting member; a center of the support member defining a hole; a center of the connecting member defining a hole; a coupling recess formed in a center of a side surface of the camera; and a connecting rod, wherein the connecting rod is inserted through the holes of the support member and connecting member and engages the coupling recess.

15. The apparatus of claim 14, further comprising:
   a washer insertion recess formed at a center of a side surface of the support member; and
   a washer inserted into the washer insertion recess.

16. The apparatus of claim 14, wherein the connecting member comprises:
   a fixed plate disposed at the first side of the connecting member, wherein the fixed plate is fixedly attached to the support member;
   a plurality of recesses formed on an outer circumferential surface of the fixed plate;
   a rotating plate disposed at the second side of the connecting member, wherein the rotating member is fixedly attached to the camera;
   a plurality of recesses formed on an outer circumferential surface of the rotating plate, wherein the plurality of recess formed on the rotating plate correspond to the plurality of recesses formed on the fixed plate; and
   a plurality of bearings that maintain an electrical circuit between the camera and the main PCB, wherein each bearing is disposed within a pair of corresponding recesses formed on the rotating plate and the fixed plate.

17. The apparatus of claim 16, further comprising:
   at least one fixing groove formed on an inner circumferential surface of the camera adjacent to a side surface of the camera;
   at least one protrusion formed on an outer circumferential surface of the rotating plate, wherein the at least one protrusion engages the at least one fixing groove to fixedly attach the rotating plate to the camera;
   at least one fixing groove formed on an inner circumferential surface of the support member; and
   at least one protrusion formed on an outer circumferential surface of the fixed plate, wherein the at least one protrusion engages the at least one fixing groove to fixedly attach the fixed plate to the support member.

18. An apparatus for a camera installed on a mobile communication terminal, the apparatus comprising: a connecting means disposed between the camera and a hinge installed on the camera to permit unrestricted rotation of the camera while maintaining an electrical circuit between the camera and a main printed circuit board (PCB) installed in the main body during rotation of the camera; wherein the connecting means comprise: a support member fixed to the hinge and comprising a center defining a hole; a connecting member for connecting the support member to the camera, wherein the connecting member comprises first and second sides and a center defining a hole; a first flexible printed circuit board (FPCB) connected at a first end to the main PCB and connected at second end to the first side of the connecting member; and a second FPCB connected at a first end to the camera and connected at a second end to the second side of the connecting member; a coupling recess formed in a center of a side surface of the camera; and a connecting rod, wherein the connecting rod is inserted through the holes of the support member and connecting member and engages the coupling recess.

19. The apparatus of claim 18, wherein the connecting means further comprises:
   a fixed plate disposed at the first side of the connecting member, wherein the fixed plate is fixedly attached to the support member;
   a rotating plate disposed at the second side of the connecting member, wherein the rotating member correspondingly rotates with the camera;
   a plurality of recesses formed on an outer circumferential surface of the fixed plate;
   a plurality of recesses formed on an outer circumferential surface of the rotating plate, wherein the plurality of recesses formed on the rotating plate correspond to the plurality of recesses formed on the fixed plate; and
   a plurality of bearings that maintain an electrical circuit between the camera and the main PCB, wherein each bearing is disposed within a pair of corresponding recesses formed on the rotating plate and the fixed plate.

* * * * *